Figure 1:
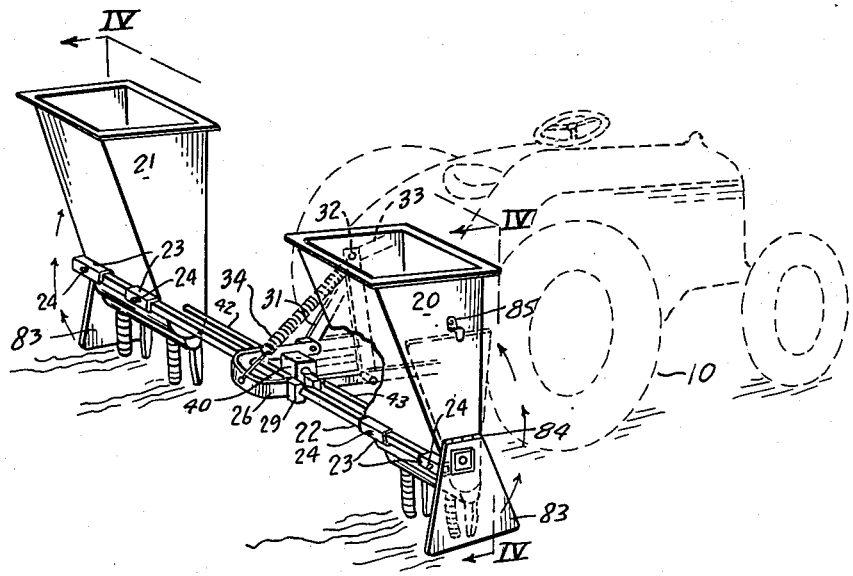
Figure 1:
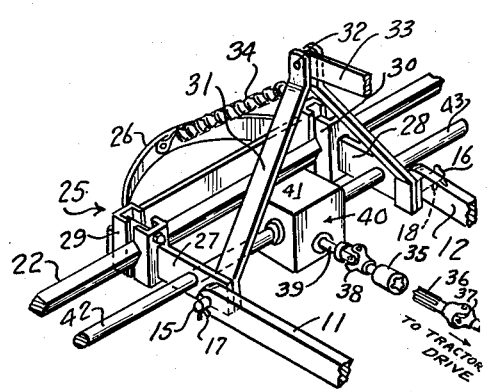

Jan. 27, 1953   R. A. SHAW   2,626,579
SIDE DRESSING ATTACHMENT
Filed July 20, 1948   2 SHEETS—SHEET 1

FIG. II.

FIG. III.

INVENTOR.
Roy A. Shaw
BY Edmund B. Whitcomb
ATTORNEY

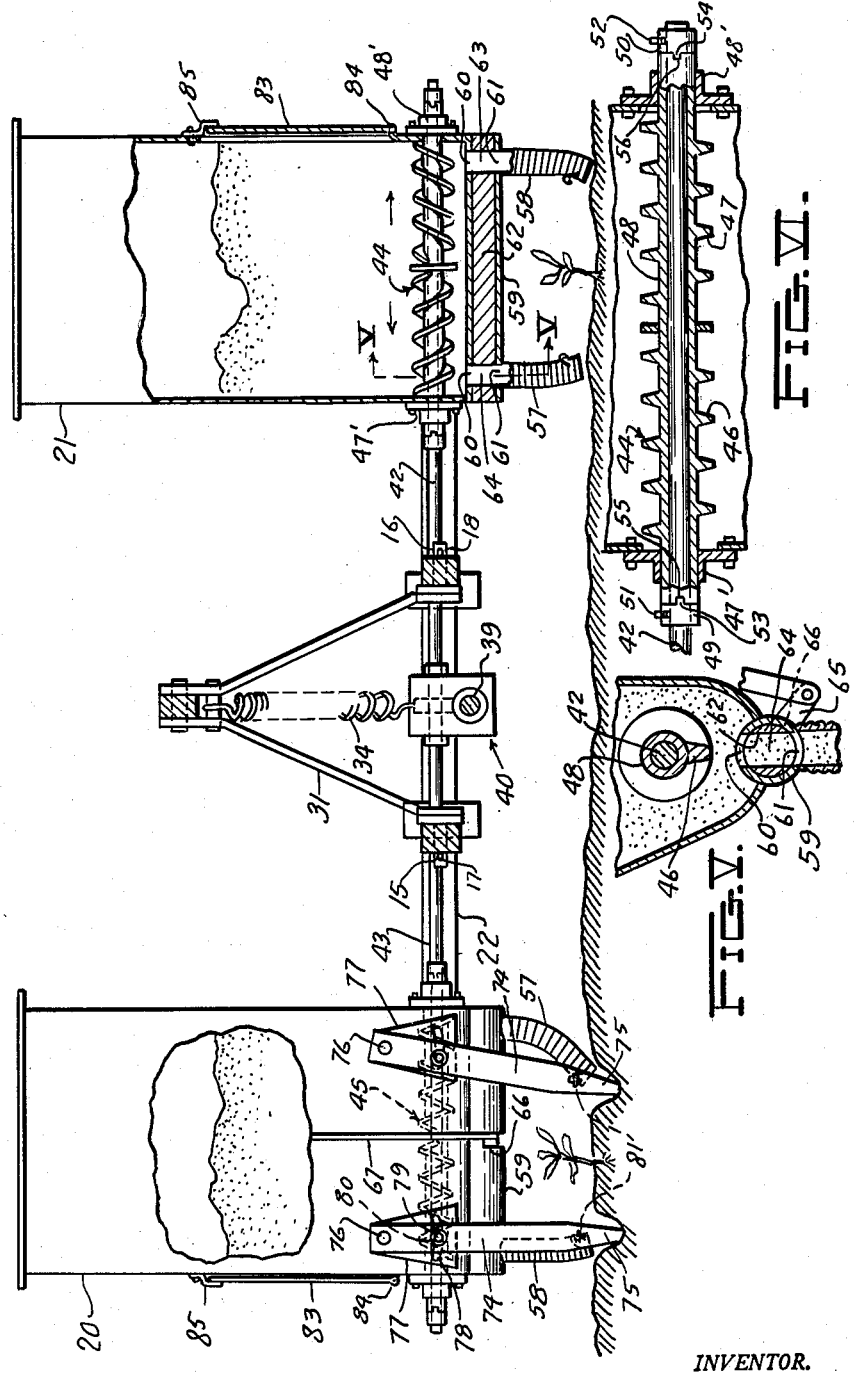

Patented Jan. 27, 1953

2,626,579

UNITED STATES PATENT OFFICE 2,626,579

SIDE DRESSING ATTACHMENT

Roy A. Shaw, San Bernardino, Calif.

Application July 20, 1948, Serial No. 39,702

1 Claim. (Cl. 111—64)

This invention relates to a mechanism forming a side dresser operated by a tractor to satisfactorily fertilize rows of plants at a desired depth in the ground, said mechanism having adjustable means for controlling the depth of the delivery of the fertilizer, as well as adjustability for different sized plants, and moreover, means are provided for dressing two rows simultaneously, and hence adjustable means are provided to compensate for various width of rows.

Another object of the present invention is to provide a mechanism of the foregoing character which can be readily attached and detached with power connections to a tractor unit.

A further object is to suitably mount the side dresser on the lift arms of a tractor so that the side dresser may be easily maneuvered while being operated and also while being transported from place to place.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure I is a perspective view of my side dresser attachment applied to a tractor, the latter shown in diagram;

Figure II is a vertical side elevation, parts in section;

Figure III is a perspective of a detail of the power drive connections and supporting frame for attaching the side dresser to the lift arms of a tractor;

Figure IV is a rear elevational view partly in section showing the entire mechanism assembled in operation;

Figure V is a sectional view, taken on the line V—V of Figure IV;

Figure VI is an enlarged sectional view of the feed screw mechanism.

Referring to the drawings in Figures I and III, the tractor illustrated in outline at 10 has the two rearwardly extending supports and lift arms 11 and 12. These lift arms have at their rearward ends suitable openings to receive suitable pins 15 and 16 on the dresser frame mechanism, whereby the dresser as a whole unit may be attached and detached from the tractor, as will hereinafter appear. Cotter pins 17 and 18 passing through pins 15 and 16 secure the mechanism in position.

As indicated in Figures I and IV, I provide spaced hoppers 20 and 21 adjustably mounted on a transverse squared bar 22, which passes through channeled members 23 fixed with each hopper. Set screws 24 associated with the channel members 23 contact the bar 22 and lock the hoppers in any desired horizontal position. The bar 22 is carried by the supporting frame indicated broadly by the reference character 25, shown in perspective in Figure III and includes the rearwardly extending curved yoke member 26 having the parallel forwardly extending arms 27 and 28, the latter carrying the pins 15 and 16 referred to above for attachment to the tractor proper. The arms 27 and 28 of the yoke 26 have a square opening therein for receiving the squared supporting rod 22 and suitable locking means 29 and 30 are used to fix the rod 22 to the supporting frame 25. This frame 25 is also provided with a vertically extending inverted V-shaped hanger 31, which at the upper vertex 32 is pivoted to a steadying arm or ridge rod 33 in turn connected to the tractor. A coil spring 34 extends between said pivot 32 and the rearmost portion of the yoke 26 to resiliently and satisfactorily support the mechanism from the tractor.

I provide a power drive mechanism having connections to the power take off from the tractor, the same including a drive member 35, adapted to engage the splined end of the tractor power take-off shaft 36 when in driving position. Universal joints 37 and 38 are provided to give flexibility to the drive assembly and prevent distortion of the tractor power take-off shaft 36 when the mechanism is in operation.

A rearwardly extending shaft 39, from the universal joint 38 connects to a reduction gear unit 40, the latter being carried by the supporting frame 25.

This gear unit 40 is enclosed in an oil-tight casing 41 and is adapted to drive two transversely extending feed screw rotating shafts 42 and 43, the shaft 42 driving a feed screw 44 in the hopper 21 and the rotatable shaft 43 driving a similarly arranged feed screw 45 located within the hopper 20 (see Figure IV).

The screw feed mechanism 44 as shown in detail in Figures IV and VI, for the hopper at the right side, or hopper 21, includes a pair of reversely arranged screw elements 46 and 47 mounted on a tubular shaft 48, the latter being adapted to rotate in bearings 47' and 48'.

Driving shaft 42 passes through the center of the tubular shaft 48 and is adapted to drive the latter by means of drive members 49 and 50 at opposite sides of the hopper which drive members are attached to the driving shaft 42 by means of set screws 51 and 52 and which drive the tubular shaft 48 by means of the engagement of lugs 53 and 54 on the clutches with slots 55 and 56 in the ends of the tubular shaft 48.

The bearings 47' and 48' are bolted to the side walls of the hopper 21, and it will be seen that if it is desired to change the position of the hopper 21, the set screws 51 and 52 on the drive members 49 and 50 can be loosened and the rotating shaft 42 can then slide within the tubular shaft 48 to the desired position; after which the set screws 51 and 52 can be tightened and the feed will be ready for operation.

By having oppositely or reversely pitched vanes of the screw threads 46 and 47 in the feed mechanisms 44, it will be seen that the rotation of the shaft 42 in one direction will gradually feed the fertilizer in opposite directions, that is, to the lower right hand and lower left hand corners of the hopper 21.

Feed screw 45 for the other hopper or for operating in hopper 20 is driven by shaft 43 and functions in the same manner as the feed screw 44 in hopper 21. Each hopper 20 and 21 has a pair of discharge tubes 57 and 58 connected to and depending from adjacent the outside corners of each hopper.

In order to suitably and adjustably control the rate of flow of the fertilizer, I provide a regulating mechanism in the form of a transverse tube 59 located in the lower portion of each of the hoppers 20 and 21, said tube being provided with a pair of openings 60 connected to and opening within the hopper at opposite corners, and similar aligned openings 61 are in the lower portion of tube 59, said openings 61 being connected with the discharge tubes 57 and 58.

I also provide for each tube 59, a central solid cylindrical member 62, the same being provided with transverse openings 64 and 63, so that when the cylinder 62 is rotated, the transverse passages 63 and 74 will uncover a larger or lesser area of the openings 60 and 61 in the transverse tube 59, thus regulating the flow of material from the hoppers 20 and 21 to the discharge tubes 57 and 58.

In order to control the adjustment of the cylindrical member 62, I provide an extending arm 65 connected therewith and adapted to pass through and move in a slot 66 in the transverse tube 59. Pivoted to the arm 65, a connection rod 67 extends to an arm 68 of an adjusting lever 69 pivoted as at 70 on each of the hoppers 20 and 21.

Associated with the adjusting lever 69 is a latch mechanism 71, the latter being adapted to engage teeth 72 in a quadrant 73 to which the lever 69 is pivoted, this latch mechanism being for the purpose of locking the mechanism in any desired position.

I also provide a pair of adjustable shovels pivoted to each of the hoppers 20 and 21, the same consisting of a shank 74 having its lower part tapered to form a portion 75 suitably shaped to open a trough in the dirt adjacent the plants in which to deposit the fertilizer, the upper part of shovel 74 being pivoted as indicated at 76 to the hopper through a trapezoidal shaped plate 77 having a curved slot 78 therein through which a pin 79 extends provided with a nut 80, the pin 79 being carried by the shank 74 of the shovel, and when adjusted in various positions along the slot 78, may be locked in suitable adjusted position as desired, to vary the angle of the side dressing shovel with respect to the plants, the depth of the trough produced by the shovel being regulated by the height at which the lift arms 11 and 12 of the tractor proper are positioned by the operator.

A connection 81 is provided between each shovel as at 82, so that tubes 57 and 58 and shovel points 75 may be adjusted simultaneously.

It will be noted that the fertilizer discharge tubes 57 and 58 are made of adjustable material so that the ends thereof may be adjusted to properly position the deposit of the fertilizer adjacent the shovel tooth 75 regardless of what position the same is adjusted, as indicated in the right hand portion of Figure IV.

I also provide a swingable stand 83 pivoted as indicated at 84 to the outside edge face of each of the hoppers 20 and 21 so that when not in use, these stands 83 may be turned downwardly and form a support for the side dresser attachment as a unit. When in use, the stands 83 on each end are turned upwardly against the outside face of the hoppers 20 and 21, where they stay out of supporting position all the time the dresser is being used, being held by latches 85.

In operation, the hoppers are first located transversely in the proper position with regard to the rows of plants to be cultivated, as indicated in Figure IV, the center of each hopper corresponding roughly with the center of the plant row.

Next, the shovels are adjusted to the proper position for most efficient fertilization of the plants, the spacing of the shovel points being determined somewhat by the root spread of the plants, as well as soil conditions. Next, fertilizer is placed in the hoppers 20 and 21, and the adjusting levers 69 are so set as to provide the proper flow of material from the hopper into the discharge chutes 57 and 58. These operations are accomplished while the swinging stands 83 are in supporting position as indicated in Figure I.

When ready to start the tractor, these stands 83 are swung out of supporting position and latched against the hopper, as shown in Figure IV.

The entire mechanism is now dragged by the tractor along the rows to be side dressed, the shovels digging furrows, as shown in Figure IV, while the discharge tubes 57 and 58 deposit fertilizer immediately behind the shovel points. Due to the movement of the shovels through the earth a small amount falls back on top of the deposited fertilizer, thus aiding in directing its action toward the plant roots and preventing it from being blown away by the wind.

As the tractor moves, the rotating shafts 42 and 43 cause the screws 45 and 46 in the hoppers 20 and 21, to rotate, thus continuously moving the contained material from the center of the hopper toward the discharge openings 60 in the transverse tube 59. This action keeps the fertilizer from clogging and keeps it moving freely out of the hopper.

It is apparent that within the scope of the invention, modifications and different arrangements may be made other than is herein disclosed, and the present disclosure is illustrative merely, the invention comprehending all variations thereof.

What I claim is:

In combination with a tractor having conventional draft and lift linkage including a generally vertical inverted V-frame and longitudinally extending link members pivoted at their rear ends to the vertex and legs of said V-frame and operatively connected to the tractor at their front ends, an attachment for side dressing and fertilizing rows of plants, said attachment comprising a rearwardly disposed curved frame member having forwardly extending legs the ends of which are pivotally connected to the legs of said V-frame, a tension spring connected between the vertex of said V-frame and the center of said curved frame member to resiliently support said curved frame member, a transverse supporting bar mounted on said curved frame member, a pair of fertilizer hoppers adjustably mounted on said bar there being a hopper on each side of said curved frame member, a plurality of furrowers mounted on each of said hoppers, means to deliver fertilizer from the hoppers to the furrows produced by said furrowers, and means to feed fertilizer from the hoppers, whereby in operation said resilient pivotal connection of the curved frame member permits said furrowers to float with respect to the tractor and contact the ground independently of vertical movements of the tractor due to irregularities of the ground.

ROY A. SHAW.

REFERENCES CITED

The following references are of record in the file of this patent:

UNITED STATES PATENTS

| Number | Name | Date |
| --- | --- | --- |
| 445,189 | McLaurin et al. | Jan. 27, 1891 |
| 852,398 | Reed | Apr. 30, 1907 |
| 1,099,304 | Katterhenry | June 9, 1914 |
| 1,864,122 | Cole | June 21, 1932 |
| 1,946,685 | Graham | Feb. 13, 1934 |
| 1,999,841 | McGregor | Apr. 30, 1935 |
| 2,058,539 | Welty et al. | Oct. 27, 1936 |
| 2,171,031 | Graham et al. | Aug. 29, 1939 |
| 2,209,029 | Kriegbaum et al. | July 23, 1940 |
| 2,247,534 | Von Schlegell | July 1, 1941 |
| 2,320,141 | Kott | May 25, 1943 |
| 2,345,804 | Gemberling et al. | Apr. 4, 1944 |